(12) United States Patent
Ranjan et al.

(10) Patent No.: US 11,750,262 B2
(45) Date of Patent: Sep. 5, 2023

(54) SYSTEMS AND METHODS FOR SURROUNDING BEAM INFORMATION INDICATION

(71) Applicant: QUALCOMM Incorporated, San Diego, CA (US)

(72) Inventors: Sharda Ranjan, Hyderabad (IN); Naga Chandan Babu Gudivada, Hyderabad (IN); Kuo-chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 16/944,958

(22) Filed: Jul. 31, 2020

(65) Prior Publication Data

US 2022/0038162 A1     Feb. 3, 2022

(51) Int. Cl.
*H04B 7/06*       (2006.01)
*H04B 17/318*     (2015.01)
*H04B 17/336*     (2015.01)
*H04W 76/11*      (2018.01)
*H04W 24/10*      (2009.01)
*H04W 64/00*      (2009.01)

(52) U.S. Cl.
CPC ......... *H04B 7/0695* (2013.01); *H04B 17/318* (2015.01); *H04B 17/336* (2015.01); *H04W 24/10* (2013.01); *H04W 64/003* (2013.01); *H04W 76/11* (2018.02)

(58) Field of Classification Search
CPC .... H04B 7/088; H04B 7/0695; H04B 7/0617; H04B 7/0639; H04B 7/0628; H04B 7/0408; H04W 24/08; H04W 16/28
See application file for complete search history.

(56) References Cited

U.S. PATENT DOCUMENTS

| | | |
|---|---|---|
| 2015/0188800 A1 | 7/2015 | Macdonald et al. |
| 2018/0049081 A1 | 2/2018 | Tseng et al. |
| 2019/0319686 A1* | 10/2019 | Chen, IV ............ H04W 72/046 |

FOREIGN PATENT DOCUMENTS

WO    WO-2018017840 A1    1/2018

OTHER PUBLICATIONS

International Search Report and Written Opinion—PCT/US2021/040680—ISA/EPO—dated Oct. 29, 2021.

* cited by examiner

*Primary Examiner* — Khalid W Shaheed
(74) *Attorney, Agent, or Firm* — Norton Rose Fulbright US LLP

(57) ABSTRACT

In one aspect, a method of wireless communication includes obtaining, by a user equipment (UE), measurement information for a current beam and one or more surrounding beams. The method also includes generating, by the UE, surrounding beam information based on the measurement information. The method further includes outputting, by the UE, an indication of the surrounding beam information. Other aspects and features are also claimed and described.

30 Claims, 10 Drawing Sheets

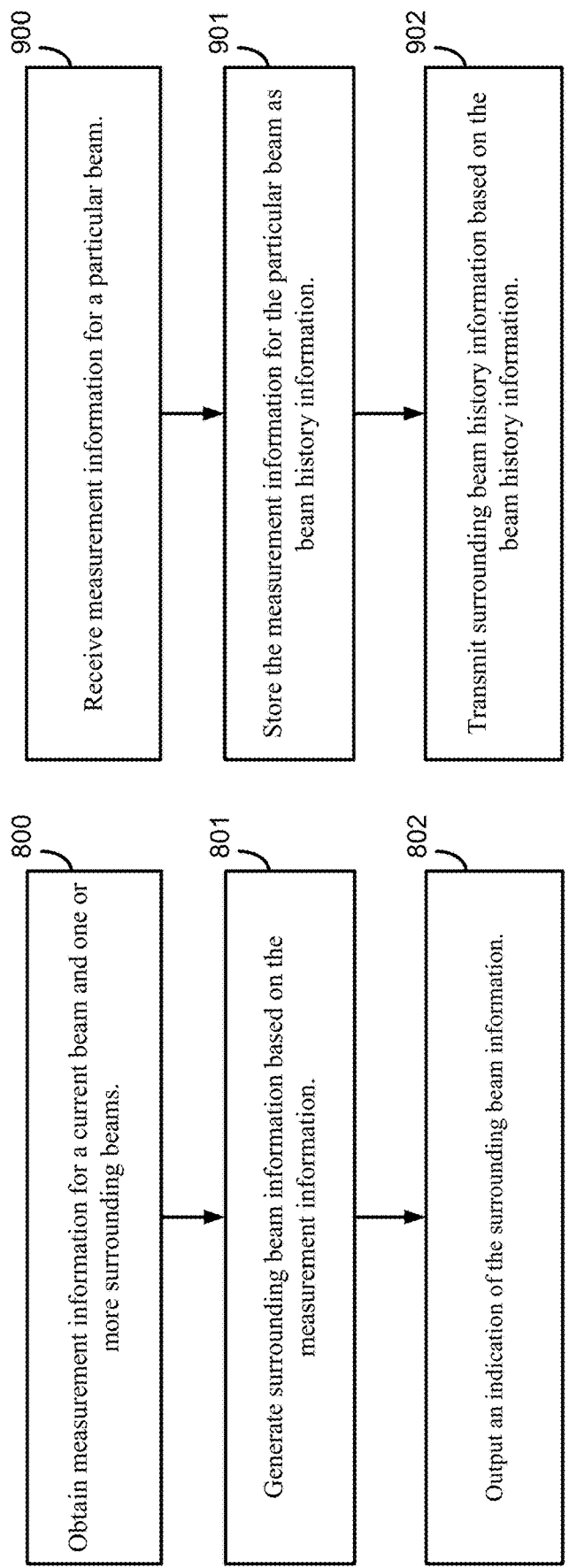

SYSTEMS AND METHODS FOR SURROUNDING BEAM INFORMATION INDICATION

TECHNICAL FIELD

Aspects of the present disclosure relate generally to wireless communication systems, and more particularly, to techniques for improving bandwidth usage. Certain embodiments of the technology discussed below can enable and provide information to user equipment to increase throughput and bandwidth.

Introduction

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes obtaining, by a user equipment (UE), measurement information for a current beam and one or more surrounding beams; generating, by the UE, surrounding beam information based on the measurement information; and outputting, by the UE, an indication of the surrounding beam information.

In an additional aspect of the disclosure, an apparatus configured for wireless communication is disclosed. The apparatus includes at least one processor, and a memory coupled to the processor. The processor is configured to obtain, by a user equipment (UE), measurement information for a current beam and one or more surrounding beams; generate, by the UE, surrounding beam information based on the measurement information; and output, by the UE, an indication of the surrounding beam information.

In another aspect of the disclosure, a method for wireless communication includes receiving, by a network entity, a beam indication from a UE indicating a current beam; determining, by a network entity, one or more surrounding beams for the current beam; generating, by the network entity, surrounding beam information for at least one beam of the one or more surrounding beams based on beam history information; and transmitting, by the network entity, the surrounding beam information to the UE.

In an additional aspect of the disclosure, an apparatus configured for wireless communication is disclosed. The apparatus includes at least one processor, and a memory coupled to the processor. The processor is configured to receiving, by a network entity, a beam indication from a UE indicating a current beam; determining, by a network entity, one or more surrounding beams for the current beam; generating, by the network entity, surrounding beam information for at least one beam of the one or more surrounding beams based on beam history information; and transmitting, by the network entity, the surrounding beam information to the UE.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8 is a block diagram illustrating example blocks executed by a UE.

FIG. 9 is a block diagram illustrating example blocks executed by a network entity.

DETAILED DESCRIPTION

Figure 1:
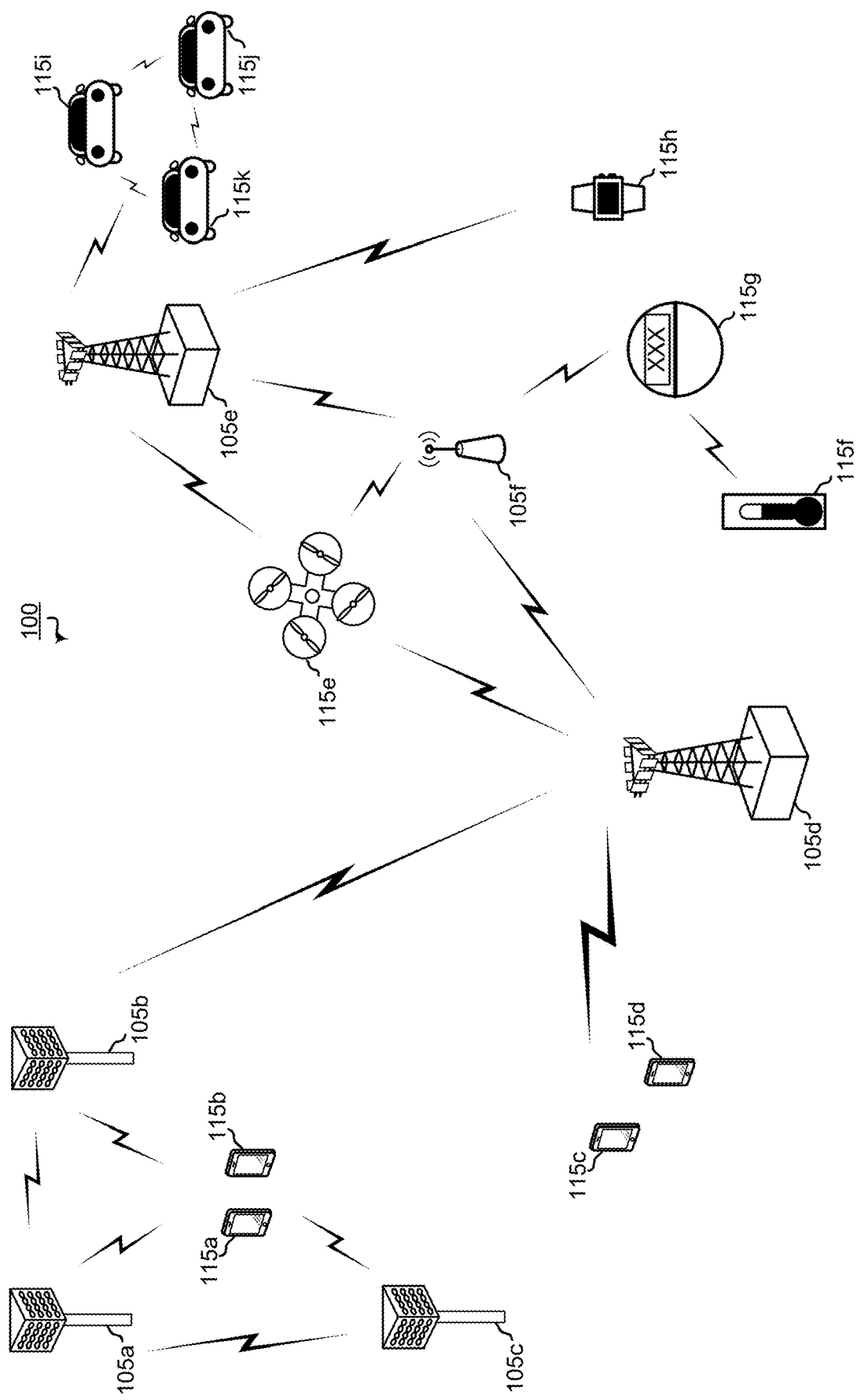
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multi-point (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
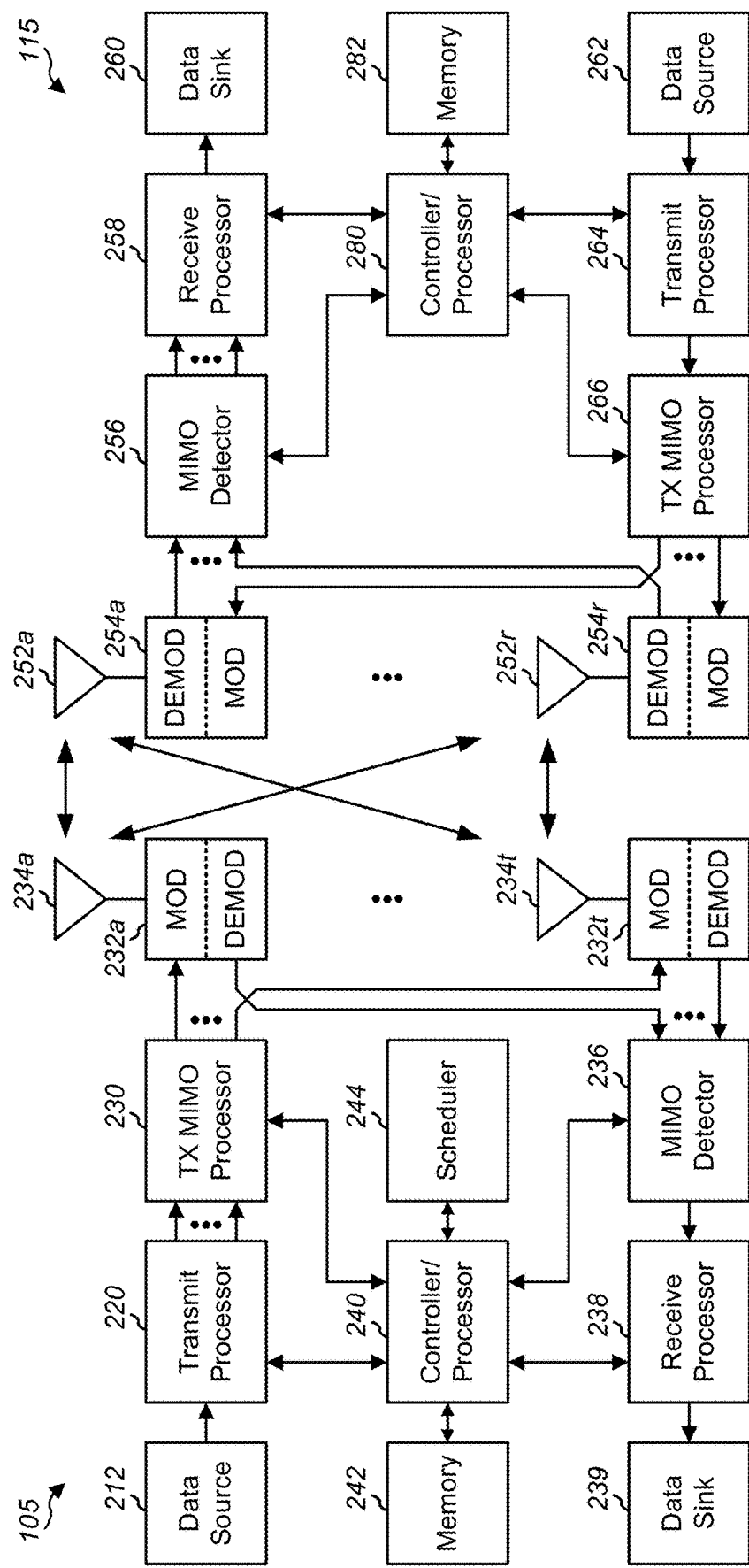
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115D operating in a service area of base station 105*f*, which in order to access small cell base station 105*f*, would be included in a list of accessible UEs for small cell base station 105*f* Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc.

The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232*a* through 232*t*. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254*a* through 254*r* (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 8 and 9, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
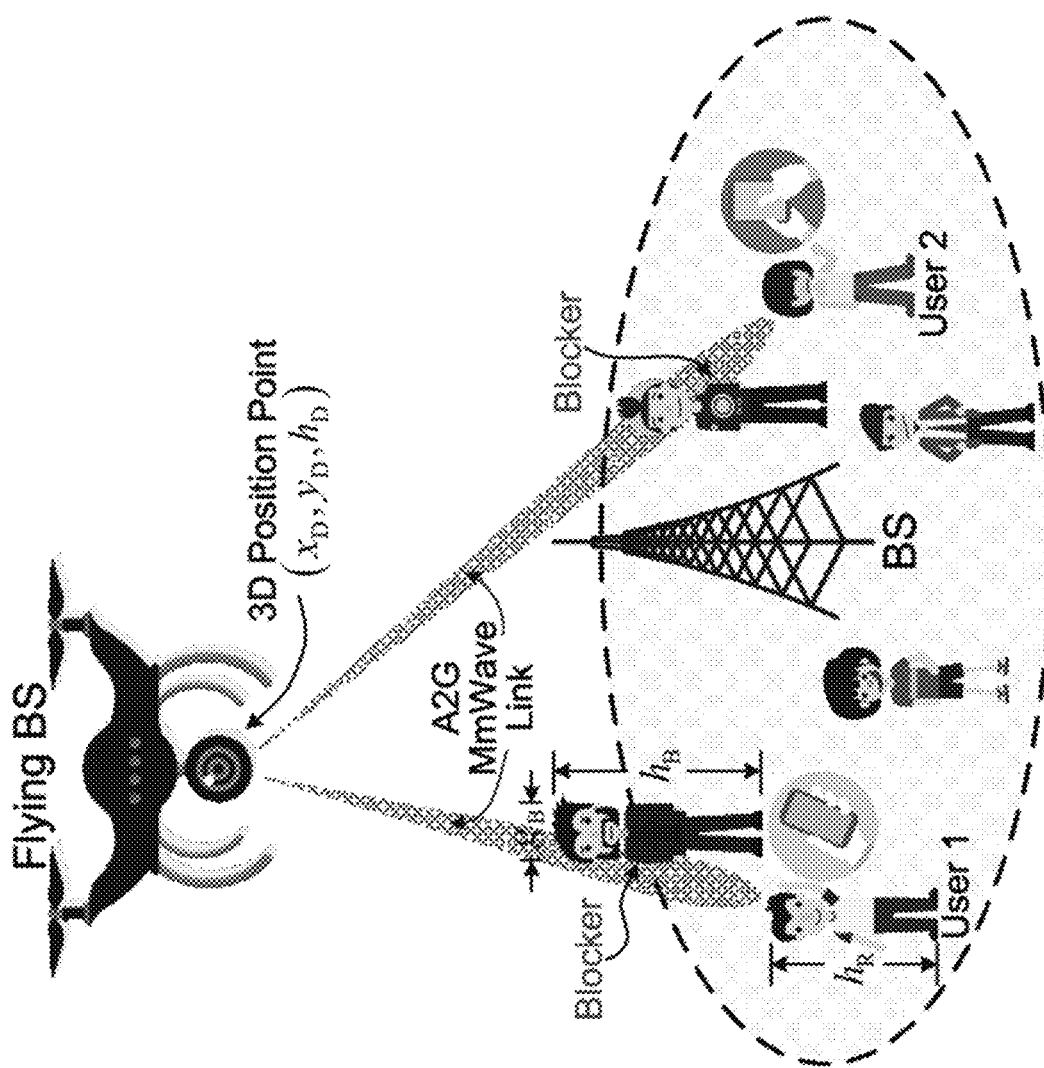
FIG. 3 illustrates a diagram depicting examples of signal blockage.

Referring to FIG. 3, FIG. 3 illustrates an example diagram 300 that illustrates examples of signal blockage in a wireless network. Referring to FIG. 3, the diagram 300 illustrates two signal paths (such as clusters in a channel over which directional beamforming can be performed) between base stations and UEs. In the example illustrated in FIG. 3, the diagram 300 illustrates two base stations, a first base station (BS) as a terrestrial base station (BS) and a second base station (Flying BS) as a flying base station. The diagram 300 also illustrates two UEs, a first UE (UE1) and a second UE (UE2).

In FIG. 3, the second base station (Flying BS) transmits downlink data via a first signal path and the second base station (Flying BS) transmits downlink data via a second signal path. The first signal path includes a path from the second base station (Flying BS) that is at least partially blocked by a first object, such as a person, and is received at the first UE (UE1). The second signal path includes a path from the second base station (Flying BS) that is at least partially blocked by a second object, such as another person, and is received at the second UE (UE2).

In FIG. 3, the UEs (e.g., users thereof) may experience better throughput and quality by moving out of a blockage condition. For example, the first UE (UE1) may experience better throughput by moving leftwards. However, a user has no way of knowing if higher throughput is available and where such higher throughput is obtainable. A user is left to attempt trial and error and hope that additional throughput or better quality exists.

The systems and methods described herein enable a network to provide quality information to UE/users to enable the UE/user increase a quality. For example, throughput and/or bandwidth indications can be provided to a user. As another example, reliability or latency indications can be provided to a user. The indications may indicate a value (relative to the current value or an absolute value) of a surrounding beam and a position of the surrounding beam. The positions may include a direction, a distance, or both. Accordingly, a user of a UE may take corrective or proactive action to increase device throughput and operation.

Figure 4:
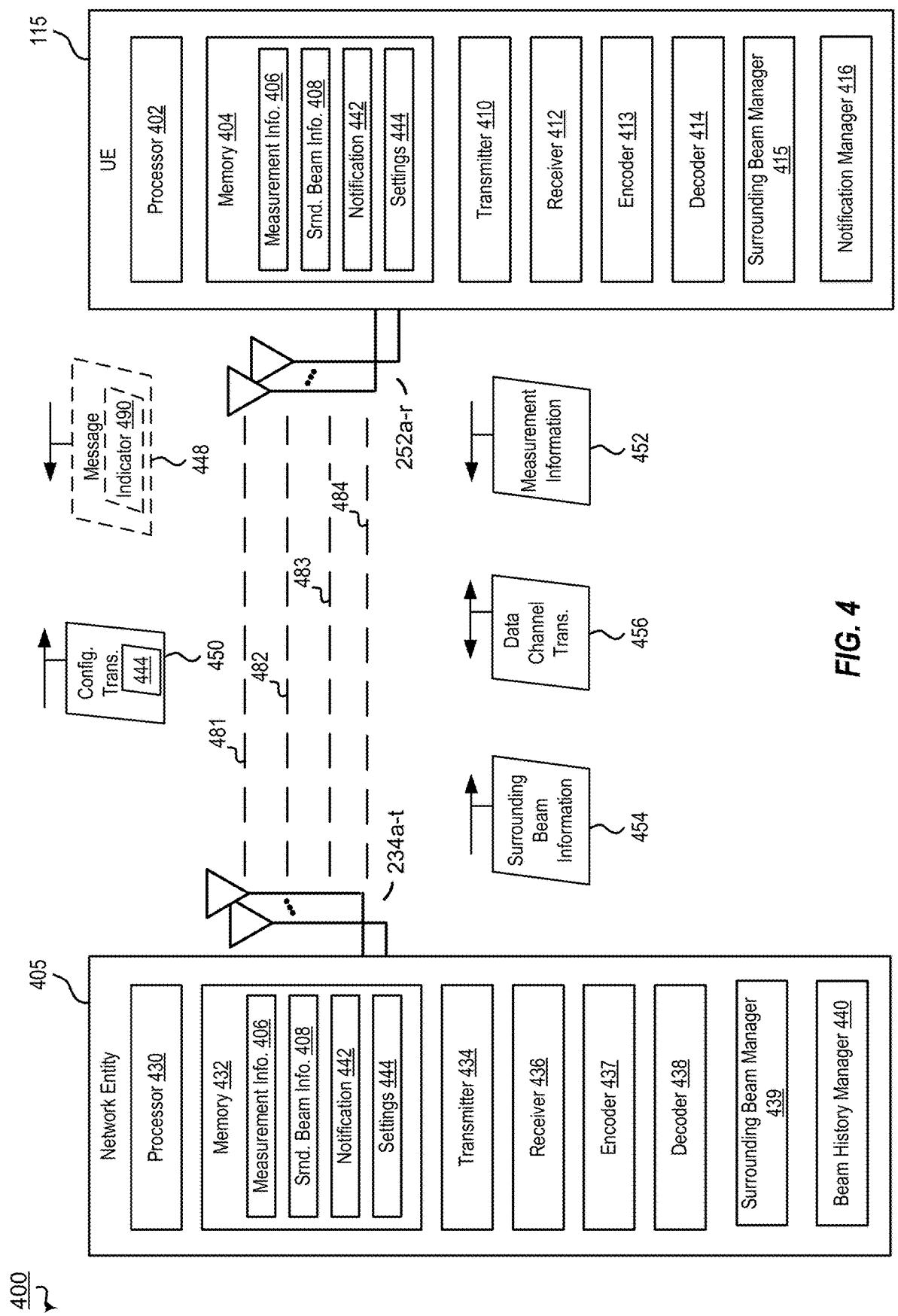
FIG. 4 is a block diagram illustrating an example of a wireless communications system that enables generation of UE bandwidth indications.

FIG. 4 illustrates an example of a wireless communications system 400 that supports surrounding beam information indications in accordance with aspects of the present disclosure. In some examples, wireless communications system 400 may implement aspects of wireless communication system 100. For example, wireless communications system 400 may include UE 115 and network entity 405. Surrounding beam information indication operations may increase throughput and reliability by providing a user of a UE with information for achieving higher throughput. Thus, network and device performance can be increased.

Network entity 405 and UE 115 UE 115 may be configured to communicate via frequency bands, such as FR1 having a frequency of 410 to 7125 MHz or FR2 having a frequency of 24250 to 52600 MHz for mm-Wave. It is noted that sub-carrier spacing (SCS) may be equal to 15, 30, 60, 120 or 240 kHz for some data channels. Network entity 405 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network entity 405 and UE 115. For example, the control information may be communicated suing MAC-CE transmissions, RRC transmissions, DCI, transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, surrounding beam manager 415, notification manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store measurement information data 406, surrounding beam information data 408, notification data 442, settings data 444, or a combination thereof, as further described herein.

The measurement information data 406 includes or corresponds to data associated with or corresponding to beam performance information. For example, the measurement information data 406 may include beam measurement data, throughput, and/or physical layer parameters, such as RSRP, SNR, beam direction/orientation (e.g., steering angle vector), beamwidth data, etc. The measurement information data 406 may include measurement information for a current beam and optionally, for one or more surrounding beams.

The surrounding beam information data 408 includes or corresponds to data indicating or corresponding to data indicating one or more surrounding beams and optionally performance data thereof. For example, the surrounding beam information data 408 may include or correspond to indications of surrounding beams. Additionally, the surrounding beam information data 408 may include or correspond to throughput and/or physical layer parameters and/or throughput. Optionally, the surrounding beam information data 408 may include historical performance data or may be based on historical data. To illustrate, the surrounding beam information data 408 may include estimated throughput which was determined based on historical physical parameters and/or historical throughput.

The notification data 442 includes or corresponds to data that indicates the surrounding beam information data 408. The notification data 442 may indicate throughput, distance, and direction, for one or more of the surrounding beams. The notification data 442 may include or correspond to auditory, visual, and/or haptic notifications. The notification data 442 may further include notification settings for generating and updating the notifications. The settings data 444 includes or corresponds to data associated with surrounding beam information indication. The settings data 444 may include one or more thresholds (e.g., threshold values) for surrounding beam information indication modes, mode selection, or a combination thereof.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Surrounding beam manager 415 may be configured to determine and perform surrounding beam information determination operations. For example, the surrounding beam manager 415 may be configured to determine one or more surrounding beams from a currently used beam, active beam, and/or selected beam. Additionally, the surrounding beam manager 415 may correlate past performance and parameters to current performance and parameters to estimate performance for the surrounding beams. To illustrate, the surrounding beam manager 415 may estimate beam performance for one or more surrounding beams based on current beam information (e.g., measuring information 406) and historical performance information for the surrounding beams, such as historical throughput and historical physical layer parameters.

Notification manager 416 may be configured to generate and output notifications. For example, notification manager 416 is configured to generate and update notifications. To illustrate, notification manager 416 is configured to evaluate surrounding beam information (408), thresholds and/or user settings to determine a set of beams to generate an indication for. The notification manager 416 is further configured to generate a visual, auditory, and/or haptic notification based on the determined set of beams. The notification may include throughput information, distance information, and/or direction information. Such information may be expressed qualitatively (e.g., better or worse, such as via green or red) or may be expressed quantitatively, such as by using absolute or relative values.

Network entity 405 includes processor 430, memory 432, transmitter 434, receiver 436, encoder 437, decoder 438, surrounding beam manager 439, beam history manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store measurement information data 406, surrounding beam information data 408, notification data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, network entity 405 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of network entity 405 described with reference to FIG. 2.

Encoder 437, and decoder 438 may include the same functionality as described with reference to encoder 413 and decoder 414, respectively. Surrounding beam manager 439 may include similar functionality as described with reference to surrounding beam manager 415. For example, the surrounding beam manager 439 may be configured to determine one or more surrounding beams from a currently used beam, active beam, and/or selected beam and retrieve historical data for the one or more surrounding beams. Optionally, the surrounding beam manager 439 may be configured to estimate performance for the determine one or more surrounding beams. Beam history manager 440 is configured to store and/or update beam history information. For example, beam history manager 440 may update or add beam history data based on received measurement information. To illustrate, the beam history manager 440 may extract measurement information for a current beam from a CSF report received from a UE and add or update past performance data for that beam in a database based on the extracted measurement information.

During operation of wireless communications system 400, network entity 405 may determine that UE 115 has surrounding beam information capability. For example, UE 115 may transmit a message 448 that includes a surrounding beam information indicator 490. Indicator 490 may indicate surrounding beam information indication capability or a particular type or mode of surrounding beam information indication. In some implementations, network entity 405 sends control information to indicate to UE 115 that surrounding beam information indication and/or a particular type of surrounding beam information indication is to be used. For example, in some implementations, message 448 (or another message, such as configuration transmission 450) is transmitted by the network entity 405. The configuration transmission 450 may include or indicate to use surrounding beam information indication or to adjust or implement a setting of a particular type of surrounding beam information indication.

During operation, devices of wireless communications system 400, perform surrounding beam information indication at user devices. Surrounding beam information indication may occur after or between CSF operations. For example, a network entity (e.g., 405) may transmit a pilot signal to UE 115. The pilot signal may be sent separately or with a data transmission. In some implementations, the pilot signal is sent with a data transmission, such as a PDSCH. In some such implementations, the pilot signal corresponds to a DMRS of a PDSCH. In a particular implementation, the pilot signal is a different type of pilot signal from a second type of pilot signal used in channel feedback, such as a CSI-RS type pilot signal used in CSF operations.

After receiving the pilot signal, the UE 115 may generate measurement data 406. For example, the UE 115 may physical layer parameter data and/or throughout data based on the pilot signal, previous transmissions, previous receptions, or a combination thereof. To illustrate, the UE 115 may generate information which indicates a physical cell identifier (PCI), Rx/Tx beam pair information, a channel quality of a serving cell, serving cell and neighbor cell measurement information, L1 filtered beam information, L3 filtered beam information, a reference signal received power (RSRP), a reference signal received quality (RSRQ), a signal-to-noise ratio (SNR), or a combination thereof.

The UE 115 may automatically send the measurement data 406 to the network entity 405. Alternatively, the UE 115 may send the measurement data 406 to the network entity 405 in response to a particular trigger condition or conditions. The trigger condition(s) may include or correspond to throughput conditions, physical layer parameter conditions, time conditions, user input conditions, network request conditions, etc. In some implementations, the measurement data 406 includes measurement data for one or more surrounding beams in addition to the current beam.

As illustrated in the example of FIG. 4, the UE 115 sends a measurement information message 452, which includes the measurement information data 406, to the network entity 405. The network entity 405 determines the surrounding beam information data 408 based on the measurement information message 452. For example, the network entity 405 determines one or more surrounding beams for a currently used beam, such as the beam used to transmits the measurement information message 452, and retrieves surrounding beam information for the one or more surrounding beams from a beam history database. Optionally, the network entity 405 may update beam history information of the beam history database based on the measurement information message 452.

The network entity 405 then transmits the surrounding beam information (e.g., surrounding beam information data 408) in a surrounding beam information message 454 to the UE 115. The surrounding beam information message 454 may be a control transmission or a data transmission.

The UE 115 obtains the surrounding beam information (e.g., surrounding beam information data 408) from the surrounding beam information message 454. The UE 115 may optionally filter the surrounding beam information and/or process the surrounding beam information data of the surrounding beam information message 454 to generate the surrounding beam information data 408 in some implementations. For example, the UE 115 may reduce a number of surrounding beams of the surrounding beam information data of the surrounding beam information message 454 based on user and/or device settings. As another example, the UE 115 extracts history information from the surrounding beam information message 454, that is surrounding beam history information, and estimates surrounding beam performance based on the surrounding beam history information to generate the surrounding beam information data 408. To illustrate, the UE 115 receives historical physical layer parameters and/or historical throughputs for the surrounding beams and estimates the present throughput for the surrounding beams based on the measurement information (e.g., physical layer parameters and/or throughput for the current beam).

In other implementations, the UE 115 does not send the measurement information data 406 to the network entity 405. In such implementations, the UE 115 uses the measurement information to locally determine and/or generate the surrounding beam information data 408.

After obtaining the surrounding beam information data 408, the UE 115 generates and outputs an notification based on the surrounding beam information data 408. For example, the UE 115 outputs an indication of the surrounding beam information data 408. The indication may include visual indications, auditory indications, and/or haptic indications. A user of the UE 115 may move or change locations based on the indication. The movement may cause the UE 115 and/or network entity 405 to utilize a new beam or beams or reduce interference for a current beam.

As illustrated in the example of FIG. 4, the network entity 405 generates and transmits one or more data channel transmissions 456 to the UE 115 using a new beam of the surrounding beams, and/or the UE 115 generates and transmits one or more data channel transmissions 456 to the network entity 405 using a new beam of the surrounding beams. To illustrate, the UE 115 uses a beam for transmission, reception, or both that is different from the beam used for messages 452, 454. As network entity 405 and/or UE 115 determined such beam to be better performing, a throughput, a latency, and/or a reliability of the channel between the network entity 405 and the UE 115 is likely to be improved.

Accordingly, a UE 115 may be able to provide indication of surrounding beam performance to a user of the UE 115, and the user of the UE 115 may be able to increase performance of the UE 115 by taking advantage of the increased performance of a particular surrounding beam.

Therefore, FIG. 4 describes surrounding beam information indication operations. Using surrounding beam information indication operations may enable increased network efficiency and utilization. Performing surrounding beam information indication operations enables enhanced UE and network performance.

Figure 5:
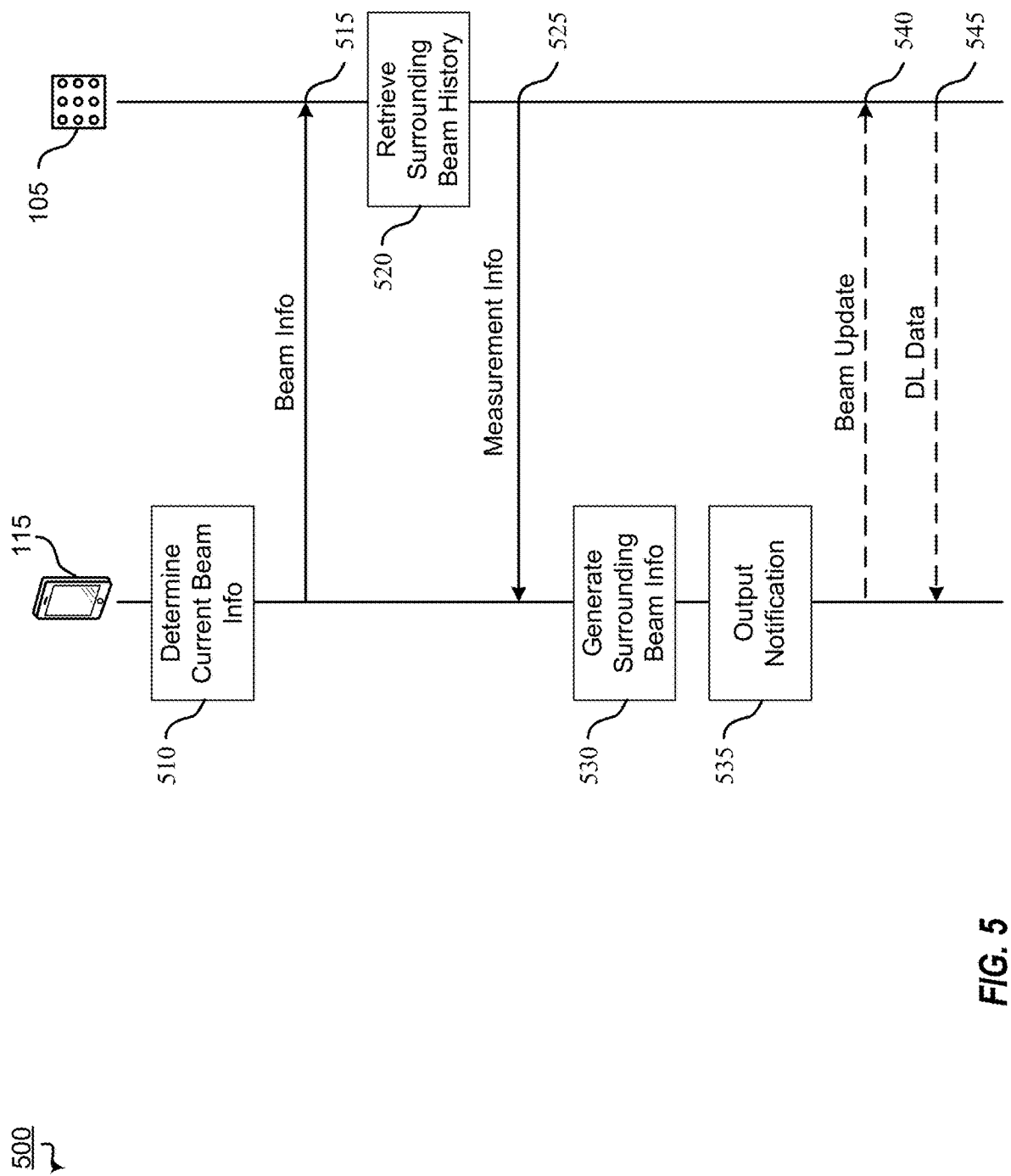
FIG. 5 is a ladder diagram illustrating an example of a process flow for a first example of generation of UE bandwidth indications.
Figure 6:
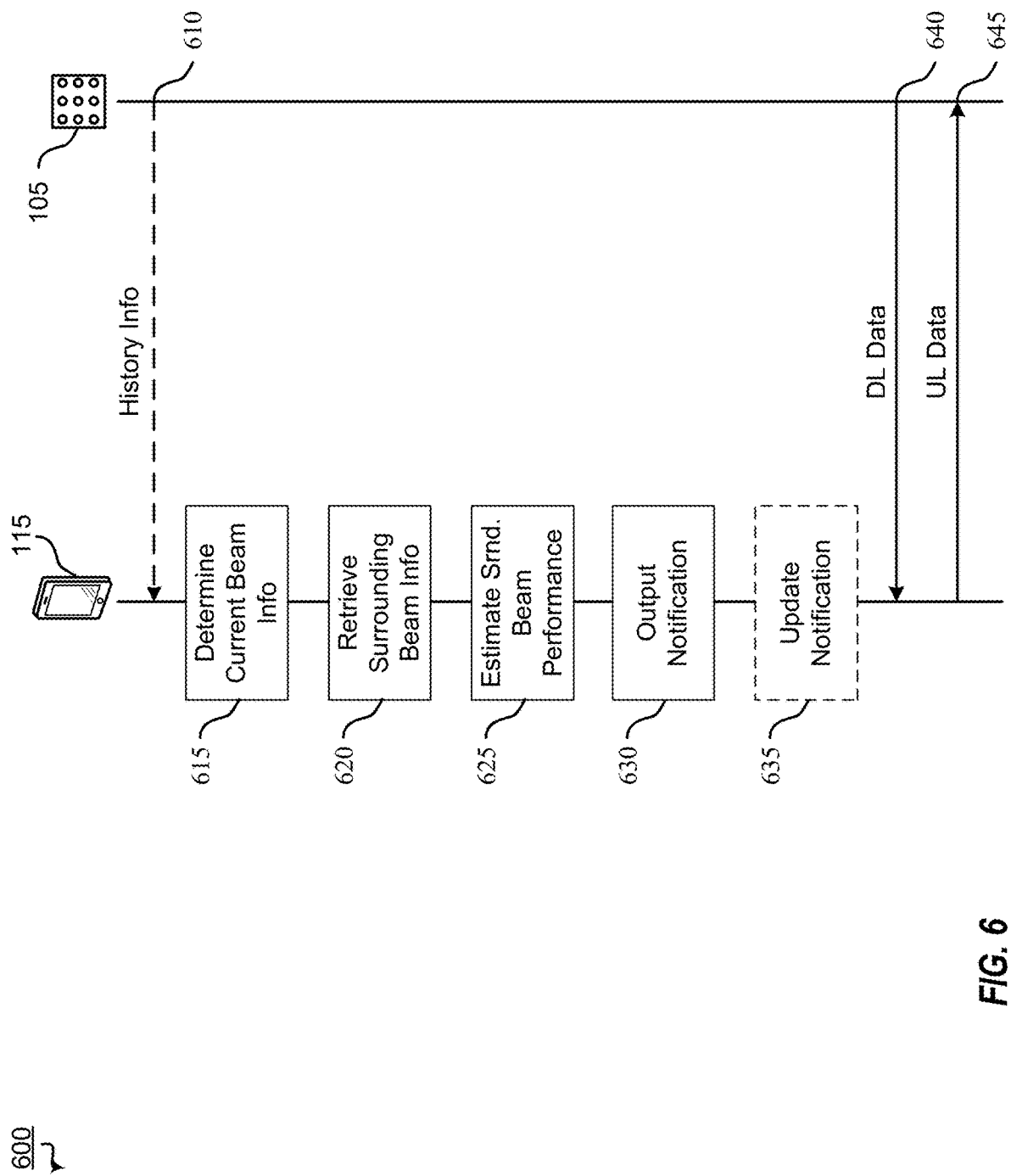
FIG. 6 is a ladder diagram illustrating an example of a process flow for a second example of generation of UE bandwidth indications.

FIGS. 5 and 6 illustrate example ladder diagrams for surrounding beam information indication operations. Referring to FIG. 5, FIG. 5 is a ladder diagram of an example of network based surrounding beam information. Said another way, the surrounding beam information is sent by the network to a device.

At 510, a UE 115 determines current beam information. For example, the UE 115 determines physical layer parameters and/or throughput information for a particular current or actively used beam. To illustrate, the UE 115 may determine such information through conventional operations.

At 515, the UE 115 transmits the current beam information to a network entity. For example, the UE 115 transmits the physical layer information and/or throughput information for a particular active beam to a base station 105. The physical layer information and/or throughput information may be sent in a specific, novel message, or as part of an existing message, such as a channel report (e.g., CSI/CSF Report).

At 520, the base station 105 determines surrounding beam information for the current beams. For example, the base station 105 determines a set of surrounding beams for the current beam based on the current beam information. To illustrate, the base station 105 determines to select all beams within a threshold distance from the current beam. Then, the base station retrieves surrounding beam history information from stored history information of past performance. The history information may include past physical layer channel measurement and/or throughput. Optionally, the base station 105 may generate surrounding beam information which indicates an estimated performance for the surrounding beam in some implementations.

At 525, the base station 105 transmits the surrounding beam information to the UE 115. For example, the base station 105 transmits the surrounding beam history and/or estimated information to the UE 115 in a new dedicated message or in a conventional, existing message. The surrounding beam information may be transmitted in a data transmission or a control transmission. In addition, the surrounding beam information may include historical physical layer information for the surrounding beams, historical throughput for the surrounding beams, estimated physical layer information for the surrounding beams, estimated throughput for the surrounding beams, or a combination thereof.

At 530, the UE 115 generates surrounding beam information based on the received surrounding beam information. For example, the UE 115 generates estimated surrounding beam throughput information based on received surrounding beam history information. To illustrate, the UE 115 beam history may include physical layer parameters such as a PCI, Rx/Tx beam pair information, a channel quality of a serving cell, serving cell and neighbor cell measurement information, L1 filtered beam information, L3 filtered beam information, a RSRP, a RSRQ, a SNR, or a combination thereof. As another example, the UE 115 filters received estimated surrounding beam throughput information to generate the surrounding throughput information. To illustrate, the UE 115 filters the received estimated surrounding beam throughput information to remove surrounding beams which do not meet stored and/or user defined criteria, such as beams which do not result in a throughput increase or are not close enough to the user.

At 535, the UE 115 generates and outputs an indication of the surrounding beam information. For example, the UE 115 outputs a visual, auditory, haptic notification, or a combination thereof. To illustrate, the UE 115 outputs a GUI which indicates throughputs, directions, and distances, such as illustrated and described with reference to FIG. 7.

At 540, the UE 115 may optionally send a beam update message. For example, responsive to the UE 115 being moved to a new location associated with a new beam, i.e., a location different from a current location associated with the current beam, the UE 115 transmits information indicating a new beam selection. To illustrate, the UE 115 may send a beam selection message or beam feedback indication indicating a particular beam and/or reference signal.

At 545, the UE 115 may optionally receive downlink data using the new beam. For example, responsive to beam update message the base station 105 may use the new beam to transmit downlink data to the UE 115. To illustrate, the UE 115 may send a beam selection message or beam feedback indication indicating a particular beam and/or reference signal.

Additionally, or alternatively, may optionally transmit uplink data using the new beam. For example, responsive to beam update message or independent of the beam update message, the UE 115 may use the new beam to transmit uplink data to the base station 105.

Thus, in the example in FIG. 5, the UE and network entity employ surrounding beam information updates using beam history information stored on the network. That is, the UE provides current beam information to the network and the network may then provide a type of surrounding beam information to the UE.

Referring to FIG. 6, FIG. 6 is a ladder diagram of an example of UE based surrounding beam information. Said another way, the surrounding beam information is retrieved by the device itself.

At 610, a UE 115 receives beam history information. For example, the UE 115 is receives physical layer parameters and/or throughput information for an cell coverage area upon connection to a network entity. As another example, the UE 115 is stores current and/or surrounding beam information during prior operations.

At 615, the UE 115 determines current beam information. For example, the UE 115 determines physical layer parameters and/or throughput information for a particular current or actively used beam. To illustrate, the UE 115 may determine such information through conventional operations.

At 620, the UE 115 determines surrounding beam information for the current beams. For example, the UE 115 determines a set of surrounding beams for the current beam based on the current beam information. To illustrate, the UE 115 determines to select all beams within a threshold distance from the current beam. Then, the UE 115 retrieves surrounding beam history information from stored history information of past performance. The history information may include past physical layer channel measurement and/or throughput.

At 625, the UE 115 generates surrounding beam information based on the received surrounding beam information. For example, the UE 115 generates estimated surrounding beam throughput information based on received surrounding beam history information. To illustrate, the UE 115 beam history may include physical layer parameters such as a PCI, Rx/Tx beam pair information, a channel quality of a serving cell, serving cell and neighbor cell measurement information, L1 filtered beam information, L3 filtered beam information, a RSRP, a RSRQ, a SNR, or a combination thereof. As another example, the UE 115 filters received estimated surrounding beam throughput information to generate the surrounding throughput information. To illustrate, the UE 115 filters the received estimated surrounding beam throughput information to remove surrounding beams which do not meet stored and/or user defined criteria, such as beams which do not result in a throughput increase or are not close enough to the user.

At 630, the UE 115 generates and outputs an indication of the surrounding beam information. For example, the UE 115 outputs a visual, auditory, haptic notification, or a combination thereof. To illustrate, the UE 115 outputs a GUI which indicates throughputs, directions, and distances, such as illustrated and described with reference to FIG. 7.

At 635, the UE 115 may optionally update the indication of the surrounding beam information. The update may include adjust the original indication or providing a second indication. For example, the UE 115 adjusts a visual, auditory, haptic notification, or a combination thereof. To illustrate, the UE 115 adjust the GUI to update throughputs, directions, and distances, such as illustrated and described with reference to FIG. 7, based on device movement, surrounding beam information change, and/or beam change.

At 640, the UE 115 may optionally receive downlink data using the new beam. For example, responsive to beam update message the base station 105 may use the new beam to transmit downlink data to the UE 115. To illustrate, the UE 115 may send a beam selection message or beam feedback indication indicating a particular beam and/or reference signal.

At 645, the UE 115 may optionally transmit uplink data using the new beam. For example, responsive to beam update message or independent of the beam update message, the UE 115 may use the new beam to transmit uplink data to the base station 105.

As compared to the example in FIG. 5, which uses network based history information, the example of FIG. 6 employs UE based history information. That is, the UE stores history information during operation and/or receives history information from the network and then determines surrounding beam and surrounding beam performance based on the locally stored history information. Particular devices may be set to operate in one triggering mode depending on hardware capabilities or may switch between the triggering modes of FIGS. 4, 5, and/or 6 based on one or more conditions or inputs.

Additionally, or alternatively, one or more operations of FIGS. 4, 5, and/or 6 may be added, removed, substituted in other implementations. For example, the downlink transmissions, such as control or data transmissions, of FIG. 6 may be used in place of or in addition to the pilot signal transmissions of FIG. 5.

Figure 7:
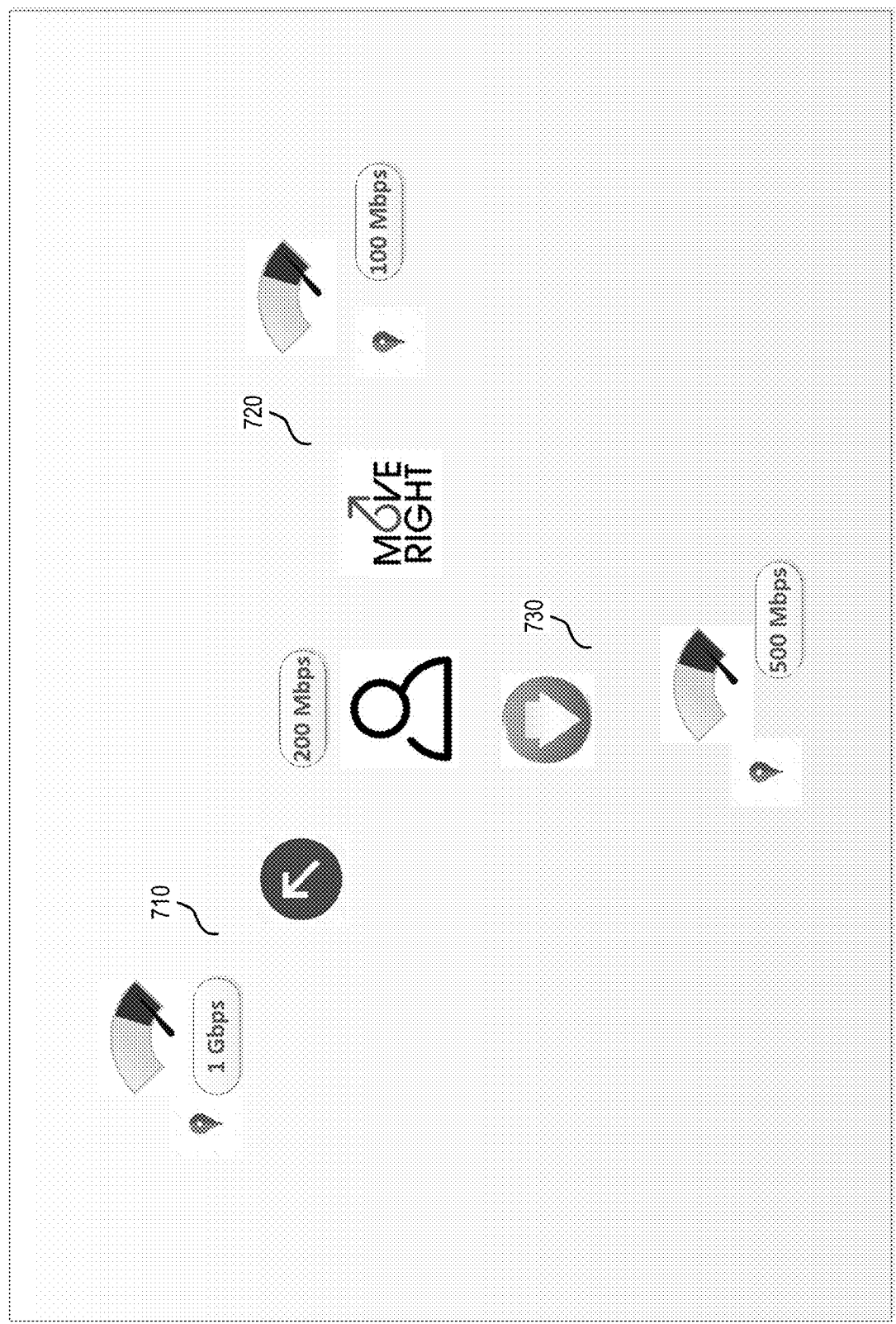
FIG. 7 is an example of a GUI notification.

FIG. 7 illustrates an example GUI 700 notification for surrounding beam information. As illustrated in FIG. 7, the GUI 700 includes multiple surrounding beam indications and a current beam indication. The current beam indications provides the user with the current throughput for the current locations. The surrounding beam indications may provide throughput information in addition to directional information.

In FIG. 7, a first surrounding beam indication 710 indicates a throughput of 1 Gbps and a direction relative to the current positions. A second beam indication 720 indicates a throughput of 100 Mbps and a direction relative to the current position. A third beam indication 730 indicates a throughput of 500 Mbps and a direction relative to the current position.

In some implementations, the GUI 700 further provides distance information. For example, the GUI may indicate to move right 5 steps. Additionally, or alternatively, the GUI 700 may not display beams with poorer performance. For example, the UE may filter the results and may only provide surrounding beam information for the beams which offer an improvement over the current beams.

In some implementations, the GUI 700 may provide a particular suggested surrounding beam which is recommended for the user. For example, the suggested surrounding beam may be determined one or more conditions to determine a best closest beam.

In some implementations, the GUI 700 is a virtual reality or augmented reality GUI. For example, the GUI 700 may be displayed on (e.g., projected on to) a headset connected to the UE or may be overlaid on top of a camera image captured by the UE an output on a display of the UE. Alternatively, the GUI 700 may be a map or overlay of the area indicting sections with higher and lower throughput. For example, a red area may indicate lower throughput and a green area may indicate higher throughput. The map and/or overlay may be two dimensional or three dimensional. For example, the map or overlay may be interactive and the user can navigate through a 3D space to find zones of higher throughput.

Figure 10:
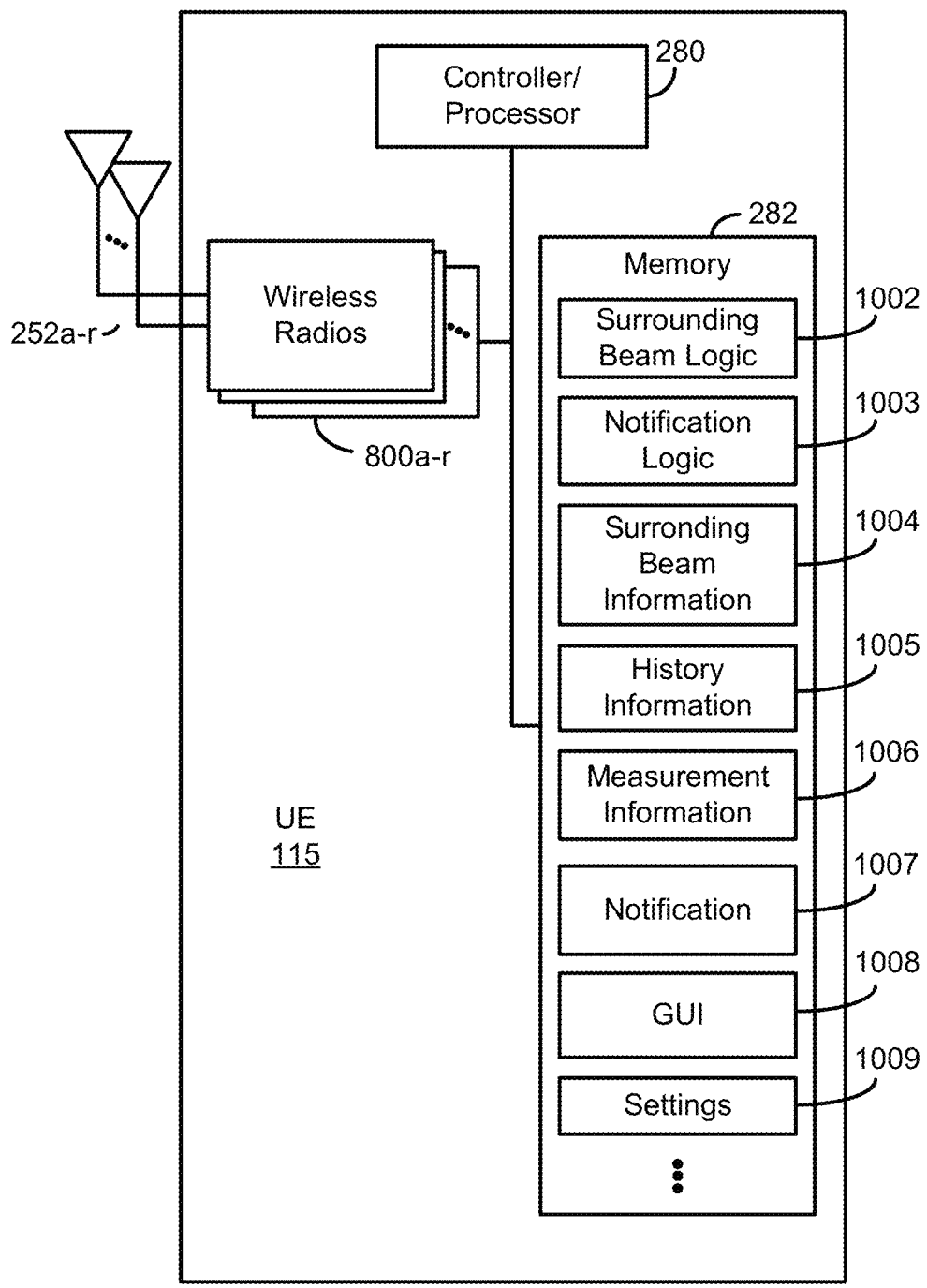
FIG. 10 is a block diagram conceptually illustrating a design of a UE configured to perform precoding information update operations according to some embodiments of the present disclosure.

FIG. 8 is a flow diagram illustrating example blocks executed by a UE configured according to an aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1000*a-r* and antennas 252*a-r*. Wireless radios 1000*a-r* includes various components and hardware, as illustrated in FIG. 2 for UE 115, including modulator/demodulators 254*a-r*, MIMO detector 256, receive processor 258, transmit processor 264, and TX MIMO processor 266. As illustrated in the example of FIG. 10, memory 282 stores surrounding beam logic 1002, notification logic 1003, surrounding beam information data 1004, history information data 1005, measurement information data 1006, notification data 1007, GUI data 1008, and settings data 1009.

At block 800, a wireless communication device, such as a UE, obtains measurement information for a current beam and one or more surrounding beams. For example, the UE 115 determines measurement information for a current beam and one or more surrounding beams, as described with reference to FIGS. 4-6.

At block 801, the UE 115 generates surrounding beam information based on the measurement information. For example, the UE 115 receives the surrounding beam information from a network entity or generates the surrounding beam information locally (e.g., retrieves from history), as described with reference to FIGS. 4-6.

At block 802, the UE 115 outputs an indication of the surrounding beam information. For example, the UE 115 outputs a notification, as described with reference to FIGS. 4-7. To illustrate, the UE 115 visually displays an indication of throughputs for surrounding beams and a location of the surrounding beams.

The UE 115 may execute additional blocks (or the UE 115 may be configured further perform additional operations) in other implementations. For example, the UE 115 may perform one or more operations described above. As another example, the UE 115 may perform one or more aspects as described below.

In a first aspect, the indication is a visual indication, an auditory indication, a haptic indication, or a combination thereof.

In a second aspect, alone or in combination with one or more of the above aspects, outputting the indication includes: the UE 115 displaying a visual indication of the surrounding beam information, and where the visual indication of the surrounding beam information indicates a throughput value, a bandwidth value, or both, for at least one beam of the one or more surrounding beams.

In a third aspect, alone or in combination with one or more of the above aspects, in the throughput value indicates an estimated throughput value of a location corresponding to the at least one beam or indicates a change in throughput value for the location with respect to a current location of the current beam.

In a fourth aspect, alone or in combination with one or more of the above aspects, the indication of the surrounding beam information comprises a notification (e.g., pop up or textual notification), wherein the notification illustrates a speed, a distance, and a direction for at least one beam of the one or more surrounding beams, wherein the speed indicates a bandwidth value or throughput value for a particular surrounding beam, wherein the distance indicates a distance value from a current location of the current beam to a particular nearby location of the particular surrounding beam, and wherein the direction indicates a direction from the current location to the particular nearby location of the particular surrounding.

In a fifth aspect, alone or in combination with one or more of the above aspects, the indication of the surrounding beam information comprises a notification, wherein the notification indicates to move locations, change orientations, or change a grip placement or location on the UE.

In a sixth aspect, alone or in combination with one or more of the above aspects, the indication of the surrounding beam information comprises a graphical user interface (GUI).

In a seventh aspect, alone or in combination with one or more of the above aspects, the GUI comprises a visual layout (e.g., map) illustrating a plurality of throughputs and corresponding directions and distances.

In an eighth aspect, alone or in combination with one or more of the above aspects, the GUI comprises an overlay illustrating areas of the surrounding beams with higher throughput and lower throughput as compared to a current throughput of the current location.

In a ninth aspect, alone or in combination with one or more of the above aspects, the UE 115 updates the GUI in response to obtaining second measurement information for a second current beam.

In a tenth aspect, alone or in combination with one or more of the above aspects, the UE 115 adjusts one or more settings of the GUI, responsive to user input; and updates the GUI based on the one or more adjusted settings, where the one or more settings include distance, direction, dimensions, color, amount of locations, speed thresholds, activation thresholds, mode thresholds, or a combination thereof.

In an eleventh aspect, alone or in combination with one or more of the above aspects, the UE 115 stores the measurement information for the current beam, the one or more surrounding beams, or both, in a local beam history, where a second indication of surrounding beam information is generated based on the local beam history.

In a twelfth aspect, alone or in combination with one or more of the above aspects, the UE 115 receives network beam history for the current beam, the one or more surrounding beams, or both, where the second indication of the surrounding beam information is generated further based on the network beam history.

In a thirteenth aspect, alone or in combination with one or more of the above aspects, the local history includes physical layer parameters and throughput, and wherein the network history includes physical layer parameters and throughput.

In a fourteenth aspect, alone or in combination with one or more of the above aspects, the UE 115 correlates the history data with current data to predict the performance of the surrounding beams.

In a fifteenth aspect, alone or in combination with one or more of the above aspects, the measurement information includes one or more physical layer parameters.

In a sixteenth aspect, alone or in combination with one or more of the above aspects, the physical layer parameters include a PCI, Rx/Tx beam pair information, a channel quality of a serving cell, serving cell and neighbor cell measurement information, L1 filtered beam information, L3 filtered beam information, a RSRP, a RSRQ, a SNR, or a combination thereof.

In a seventeenth aspect, alone or in combination with one or more of the above aspects, the measurement information includes bandwidth information, throughput information, or both.

In an eighteenth aspect, alone or in combination with one or more of the above aspects, obtaining the measurement information includes: the UE 115 generating current beam measurement information for the current beam; and retrieving the surrounding beam measurement information for the surrounding beams from beam measurement history information.

In a nineteenth aspect, alone or in combination with one or more of the above aspects, obtaining the measurement information includes generating current beam measurement information for the current beam, and the UE 115 further generates current beam performance information for the current beam based on the current beam measurement information for the current beam.

In a twentieth aspect, alone or in combination with one or more of the above aspects, generating the surrounding beam information includes: the UE 115 estimating surrounding beam performance information for the surrounding beams based on the current beam measurement information, the current beam performance information, the surrounding beam measurement information, or a combination thereof.

In a twenty-first aspect, alone or in combination with one or more of the above aspects, obtaining the measurement information includes: the UE 115 generating current beam measurement information for the current beam; sending the current beam measurement information for the current beam to the network; and receiving surrounding beam measurement information for the one or more surrounding beams from the network.

In a twenty-second aspect, alone or in combination with one or more of the above aspects, the UE 115 generates current beam performance information for the current beam based on the current beam measurement information for the current beam, where the surrounding beam measurement information corresponds to historical performance data, and where generating the surrounding beam information includes: the UE 115 correlating the historical performance data with the current beam performance information to predict performance of the surrounding beams.

In a twenty-third aspect, alone or in combination with one or more of the above aspects, the surrounding beam measurement information corresponds to historical data rates near the present location, and where generating the surrounding beam information includes correlating Rx/Tx beam pair, PCI, channel quality with 3D position using historical data rates near the present location.

In a twenty-fourth aspect, alone or in combination with one or more of the above aspects, obtaining the measurement information includes: the UE 115 receiving, from the network, beam performance information for the current beam and the one or more surrounding beams, where the beam performance information indicates throughput, bandwidth, or both.

In a twenty-fifth aspect, alone or in combination with one or more of the above aspects, generating the surrounding beam information includes: the UE 115 selecting a particular number of surrounding beams based on the beam performance information; and generating the surrounding beam information for the particular number of surrounding beams of the one or more surrounding beams.

Accordingly, a UE and a base station may perform surrounding beam information indication operations. By performing surrounding beam information indication operations, throughput and reliability may be increased.

Figure 11:
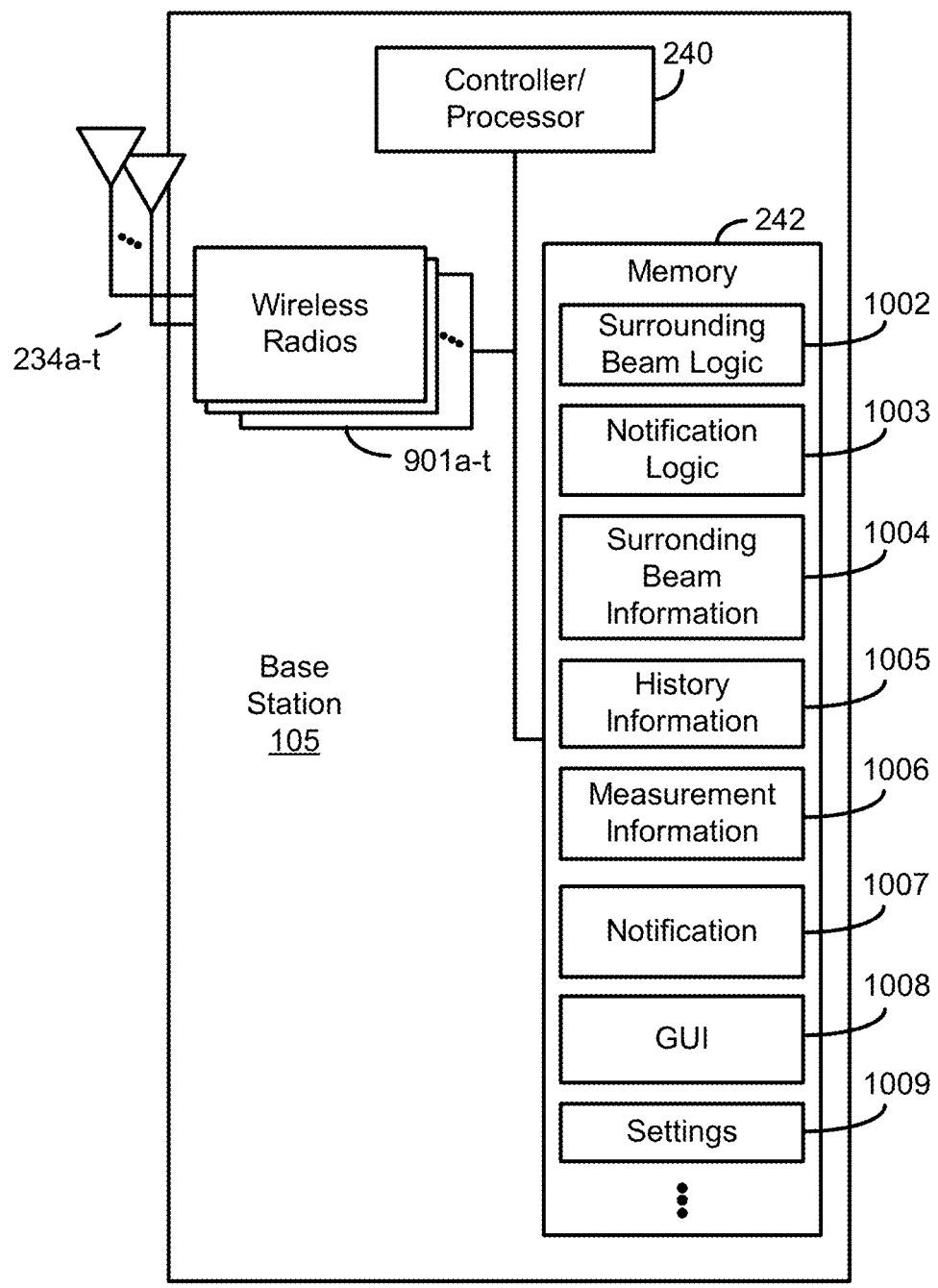
FIG. 11 is a block diagram conceptually illustrating a design of a base station configured to perform precoding information update operations according to some embodiments of the present disclosure.

FIG. 9 is a flow diagram illustrating example blocks executed by wireless communication device configured according to another aspect of the present disclosure. The example blocks will also be described with respect to base station 105 (e.g., gNB) as illustrated in FIG. 11. FIG. 11 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1101a-t and antennas 234a-t. Wireless radios 1101a-t includes various components and hardware, as illustrated in FIG. 2 for base station 105, including modulator/demodulators 232a-t, MIMO detector 236, receive processor 238, transmit processor 220, and TX MIMO processor 230. As illustrated in the example of FIG. 11, memory 242 stores surrounding beam logic 1102, notification logic 1103, surrounding beam information data 1104, history information data 1105, measurement information data 1106, notification data 1107, GUI data 1108, and settings data 1109. One of more of 1102-1109 may include or correspond to one of 1002-1009.

At block 900, a wireless communication device, such as a base station, receives measurement information for a particular beam. For example, the base station 105 receives measurement information for a current/actively used beam, as described with reference to FIGS. 4-6. Additionally, the base station 105 may receive measurement information for one or more beams that are proximate to the current beam, referred to as surrounding beams.

At block 901, the base station 105 stores the measurement information for the particular beam as beam history information. For example, the base station 105 stores physical layer parameters and/or throughput for the beam, as described with reference to FIGS. 4-6. Additionally, the base station 105 may store physical layer parameters and/or throughput for the surrounding beams.

At block 902, the base station 105 transmits surrounding beam history information based on the beam history information. For example, the base station 105 retrieves history information based on received measurement information (e.g., second measurement information) to generate surrounding beam history information. The base station 105 transmits the surrounding beam history information to the UE 115, as described with reference to FIGS. 4-6.

The base station 105 may execute additional blocks (or the base station 105 may be configured further perform additional operations) in other implementations. For example, the base station 105 may perform one or more operations described above. As another example, the base station 105 may perform one or more aspects as described below.

In a first aspect, the surrounding beam information is configured to enable the UE to generate an indication of the surrounding beam information, where the indication is a visual indication, an auditory indication, a haptic indication, or a combination thereof.

In a second aspect, alone or in combination with one or more of the above aspects, outputting the indication includes: the UE 115 displaying a visual indication of the surrounding beam information, and where the visual indication of the surrounding beam information indicates a throughput value, a bandwidth value, or both, for at least one beam of the one or more surrounding beams.

In a third aspect, alone or in combination with one or more of the above aspects, the throughput value indicates an estimated throughput value of a location corresponding to the at least one beam or indicates a change in throughput value for the location with respect to a current location of the current beam.

In a fourth aspect, alone or in combination with one or more of the above aspects, the indication of the surrounding beam information comprises a notification (e.g., pop up or textual notification), wherein the notification illustrates a speed, a distance, and a direction for at least one beam of the one or more surrounding beams, wherein the speed indicates a bandwidth value or throughput value for a particular surrounding beam, wherein the distance indicates a distance value from a current location of the current beam to a particular nearby location of the particular surrounding beam, and wherein the direction indicates a direction from the current location to the particular nearby location of the particular surrounding.

In a fifth aspect, alone or in combination with one or more of the above aspects, the indication of the surrounding beam information comprises a notification, wherein the notification indicates to move locations, change orientations, or change a grip placement or location on the UE.

In a sixth aspect, alone or in combination with one or more of the above aspects, the indication of the surrounding beam information comprises a graphical user interface (GUI).

In a seventh aspect, alone or in combination with one or more of the above aspects, the GUI comprises a visual layout (e.g., map) illustrating a plurality of throughputs and corresponding directions and distances.

In an eighth aspect, alone or in combination with one or more of the above aspects, the GUI comprises an overlay illustrating areas of the surrounding beams with higher throughput and lower throughput as compared to a current throughput of the current location.

In a ninth aspect, alone or in combination with one or more of the above aspects, the base station 105 receives measurement information for the current beam and stores the measurement information for the current beam, the one or more surrounding beams, or both, in the beam history information.

In a tenth aspect, alone or in combination with one or more of the above aspects, the measurement information includes one or more physical layer parameters.

In an eleventh aspect, alone or in combination with one or more of the above aspects, the physical layer parameters include a PCI, Rx/Tx beam pair information, a channel quality of a serving cell, serving cell and neighbor cell measurement information, L1 filtered beam information, L3 filtered beam information, a RSRP, a RSRQ, a SNR, or a combination thereof.

In a twelfth aspect, alone or in combination with one or more of the above aspects, the measurement information includes bandwidth information, throughput information, or both.

In a thirteenth aspect, alone or in combination with one or more of the above aspects, the beam history information includes physical layer parameters and throughput.

In a fourteenth aspect, alone or in combination with one or more of the above aspects, the base station 105 correlates history data for the one or more surrounding beams with current measurement data to predict the performance of the surrounding beams, and where the surrounding beam information transmitted to the UE indicates the predicted performance of the one or more surrounding beams.

In a fifteenth aspect, alone or in combination with one or more of the above aspects, generating the surrounding beam information includes: the information includes: base station 105 receiving current beam measurement information, current beam performance information, surrounding beam measurement information, or a combination thereof, and estimating surrounding beam performance information for the surrounding beams based on the current beam measurement information, the current beam performance information, the surrounding beam measurement information, or a combination thereof.

In a sixteenth aspect, alone or in combination with one or more of the above aspects, the base station 105 receives current beam measurement information for the current beam; and transmits surrounding beam measurement information for the one or more surrounding beams from the network.

In a seventeenth aspect, alone or in combination with one or more of the above aspects, the base station 105 receives current beam performance information for the current beam from the UE 115 (which may be generated by the UE 115 based on the current beam measurement information for the current beam), where the surrounding beam measurement information corresponds to historical performance data, and where generating the surrounding beam information includes: the base station 105 correlating the historical performance data with the current beam performance information to predict performance of the surrounding beams.

In an eighteenth aspect, alone or in combination with one or more of the above aspects, the surrounding beam measurement information corresponds to historical data rates near the present location, and where generating the surrounding beam information includes correlating Rx/Tx beam pair, PCI, channel quality with 3D position using historical data rates near the present location.

In a nineteenth aspect, alone or in combination with one or more of the above aspects, the base station 105 transmits beam performance information for the current beam and the one or more surrounding beams, where the beam performance information indicates throughput, bandwidth, or both.

In a twentieth aspect, alone or in combination with one or more of the above aspects, generating the surrounding beam information includes: the base station 105 selecting a particular number of surrounding beams based on the beam performance information; and generating the surrounding beam information for the particular number of surrounding beams of the one or more surrounding beams.

In a twenty-first aspect, alone or in combination with one or more of the above aspects, the base station 105 receives current beam measurement information for the current beam from the UE, and where generating the surrounding beam information includes the base station 105 retrieving surrounding beam measurement information for the surrounding beams from the beam measurement history.

In a twenty-second aspect, alone or in combination with one or more of the above aspects, generating the surrounding beam information includes: the base station 105 estimating surrounding beam performance information for the surrounding beams based on current beam measurement information, current beam performance information, surrounding beam measurement information, or a combination thereof.

In a twenty-third aspect, alone or in combination with one or more of the above aspects, the base station 105 receives current beam measurement information for the current beam from the UE; and where transmitting the surrounding beam information includes transmits surrounding beam performance information for the one or more surrounding beams.

In another aspect, a method of wireless communication includes: receiving, by a network entity, measurement information for a particular beam; storing, by the network entity, the measurement information for the particular beam as beam history information; and transmitting, by the network entity, surrounding beam history information based on the beam history information.

Accordingly, a UE and a base station may perform surrounding beam information indication operations. By performing surrounding beam information indication operations, throughput and reliability may be increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to surrounding beam information indication may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 8 and 9) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a web site, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
 obtaining, by a user equipment (UE), measurement information for a current beam and one or more surrounding beams;
 generating, by the UE, surrounding beam information based on the measurement information; and
 outputting, by the UE, an indication of the surrounding beam information, wherein the indication is a visual indication, an auditory indication, a haptic indication, or a combination thereof.

2. The method of claim 1, wherein outputting the indication includes:
 displaying, by the UE, a visual indication of the surrounding beam information, and wherein the visual indication of the surrounding beam information indicates a throughput value, a bandwidth value, or both, for at least one beam of the one or more surrounding beams.

3. The method of claim 2, wherein the throughput value indicates an estimated throughput value of a location corresponding to the at least one beam or indicates a change in throughput value for the location with respect to a current location of the current beam.

4. The method of claim 1, wherein the indication of the surrounding beam information comprises a notification, wherein the notification illustrates a speed, a distance, and a direction for at least one beam of the one or more surrounding beams, wherein the speed indicates a bandwidth value or throughput value for a particular surrounding beam, wherein the distance indicates a distance value from a current location of the current beam to a particular nearby location of the particular surrounding beam, and wherein the direction indicates a direction from the current location to the particular nearby location of the particular surrounding.

5. The method of claim 1, wherein the indication of the surrounding beam information comprises a notification, wherein the notification indicates to move locations, change orientations, or change a grip placement or location on the UE.

6. The method of claim 1, wherein the indication is the visual indication, wherein the visual indication of the surrounding beam information comprises a graphical user interface (GUI), and wherein the GUI comprises a visual layout illustrating a plurality of throughputs and corresponding directions and distances.

7. The method of claim 1, wherein the indication is the visual indication, wherein the visual indication of the surrounding beam information comprises a graphical user interface (GUI), and wherein the GUI comprises an overlay illustrating areas of the surrounding beams with higher throughput and lower throughput as compared to a current throughput of a current location of the UE.

8. The method of claim 1, further comprising updating, by the UE, a graphical user interface (GUI) in response to obtaining second measurement information for a second current beam.

9. The method of claim 1, further comprising storing, by the UE, the measurement information for the current beam, the one or more surrounding beams, or both, in a local beam history, wherein a second indication of surrounding beam information is generated based on the local beam history.

10. An apparatus configured for wireless communication, comprising:
at least one processor; and
a memory coupled to the at least one processor,
wherein the at least one processor is configured to:
obtain, by a user equipment (UE), measurement information for a current beam and one or more surrounding beams;
generate, by the UE, surrounding beam information based on the measurement information; and
output, by the UE, an indication of the surrounding beam information, wherein the indication is a visual indication, an auditory indication, a haptic indication, or a combination thereof.

11. The apparatus of claim 10, wherein the measurement information includes one or more physical layer parameters, and wherein the physical layer parameters include a physical cell identifier (PCI), Rx/Tx beam pair information, a channel quality of a serving cell, serving cell and neighbor cell measurement information, L1 filtered beam information, L3 filtered beam information, a reference signal received power (RSRP), a reference signal received quality (RSRQ), a signal-to-noise ratio (SNR), or a combination thereof.

12. The apparatus of claim 10, wherein the measurement information includes bandwidth information, throughput information, or both.

13. The apparatus of claim 10, wherein obtaining the measurement information includes:
generating, by the UE, current beam measurement information for the current beam; and
retrieving, by the UE, surrounding beam measurement information for the surrounding beams from beam measurement history information stored at the UE.

14. The apparatus of claim 10, wherein obtaining the measurement information includes generating, by the UE, current beam measurement information for the current beam, and further comprising:
generating, by the UE, current beam performance information for the current beam based on the current beam measurement information for the current beam.

15. The apparatus of claim 14, wherein generating the surrounding beam information includes:
estimating, by the UE, surrounding beam performance information for the surrounding beams based on the current beam measurement information, the current beam performance information, surrounding beam measurement information, or a combination thereof.

16. The apparatus of claim 10, wherein obtaining the measurement information includes:
generating, by the UE, current beam measurement information for the current beam;
sending, by the UE, the current beam measurement information for the current beam to a network entity; and
receiving, by the UE, surrounding beam measurement information for the one or more surrounding beams from the network entity.

17. The apparatus of claim 16, further comprising generating, by the UE, current beam performance information for the current beam based on the current beam measurement information for the current beam, wherein the surrounding beam measurement information corresponds to historical performance data, and wherein generating the surrounding beam information includes:
correlating, by the UE, the historical performance data with the current beam performance information to predict performance of the surrounding beams.

18. The apparatus of claim 16, wherein the surrounding beam measurement information corresponds to historical data rates near a present location of the UE, and wherein generating the surrounding beam information includes correlating Rx/Tx beam pair information, a physical cell identifier (PCI), and channel quality information with 3D position information using historical data rates near the present location.

19. The apparatus of claim 10, wherein obtaining the measurement information includes:
receiving, by the UE, beam performance information for the current beam and the one or more surrounding beams, wherein the beam performance information indicates throughput, bandwidth, or both.

20. The apparatus of claim 19, wherein generating the surrounding beam information includes:
selecting, by the UE, a particular number of surrounding beams based on the beam performance information; and
generating, by the UE, the surrounding beam information for the particular number of surrounding beams of the one or more surrounding beams.

21. A method of wireless communication comprising:
receiving, by a network entity, a beam indication from a user equipment (UE) indicating a current beam;
determining, by a network entity, one or more surrounding beams for the current beam;
generating, by the network entity, surrounding beam information for at least one beam of the one or more surrounding beams based on beam history information; and
transmitting, by the network entity, the surrounding beam information to the UE.

22. The method of claim 21, wherein the surrounding beam information includes physical layer parameters, throughput information, or both.

23. The method of claim 22, wherein the physical layer parameters include a physical cell identifier (PCI), Rx/Tx beam pair information, a channel quality of a serving cell, serving cell and neighbor cell measurement information, L1 filtered beam information, L3 filtered beam information, a reference signal received power (RSRP), a reference signal received quality (RSRQ), a signal-to-noise ratio (SNR), or a combination thereof.

24. The method of claim 21, wherein the surrounding beam information includes estimated bandwidth information, estimated throughput information, or both.

25. The method of claim 21, wherein the surrounding beam information includes historical bandwidth information, historical throughput information, or both.

26. An apparatus configured for wireless communication, comprising:
at least one processor; and
a memory coupled to the at least one processor,
wherein the at least one processor is configured to:
receive, by a network entity, a beam indication from a user equipment (UE) indicating a current beam, wherein the network entity is a base station;
determine, by a network entity, one or more surrounding beams for the current beam;
generate, by the network entity, surrounding beam information for at least one beam of the one or more surrounding beams based on beam history information; and transmit, by the network entity, the surrounding beam information to the UE.

27. The apparatus of claim 26, wherein the processor is further configured to receive, by the network entity, current beam measurement information for the current beam from the UE, and wherein generating the surrounding beam information includes retrieving, by the network entity, surrounding beam measurement information for the surrounding beams from beam measurement history information.

28. The apparatus of claim 26, wherein generating the surrounding beam information includes:
estimating, by the network entity, surrounding beam performance information for the surrounding beams based on current beam measurement information, current beam performance information, surrounding beam measurement information, or a combination thereof.

29. The apparatus of claim 26, wherein the processor is further configured to receive, by the network entity, current beam measurement information for the current beam; and wherein transmitting the surrounding beam information includes transmitting, by the network entity, surrounding beam performance information for the one or more surrounding beams for the current beam.

30. The method of claim 21, wherein the surrounding beam information includes physical layer parameter information, throughput information, bandwidth information, or a combination thereof, wherein the surrounding beam information is configured to enable the UE to output an indication based on the surrounding beam information, and wherein the indication is a visual indication, an auditory indication, a haptic indication, or a combination thereof.

* * * * *